United States Patent
Venetta, II et al.

[19]

[11] Patent Number: 6,161,663
[45] Date of Patent: Dec. 19, 2000

[54] STROKE LIMITING VELOCITY SENSITIVE VALVE FOR A HYDRAULIC LOCK MECHANISM

[75] Inventors: Richard Daniel Venetta, II, Alden; Terrance E. Daul, Hamburg, both of N.Y.

[73] Assignee: Enidine, Incorporated, Orchard Park, N.Y.

[21] Appl. No.: 09/130,501

[22] Filed: Aug. 7, 1998

[51] Int. Cl.[7] .................................................. F16F 9/32
[52] U.S. Cl. .......................... 188/300; 188/278; 188/317; 267/64.12; 297/423.25; 297/423.1
[58] Field of Search .................... 188/278, 300, 188/299.1, 317; 267/64.12; 297/423.25, 423.26, 423.2, 423.19, 423.1

[56] References Cited

U.S. PATENT DOCUMENTS

| | | | |
|---|---|---|---|
| 3,528,532 | 9/1970 | Moskow | 188/300 |
| 4,155,433 | 5/1979 | Porter | 188/300 |
| 5,005,677 | 4/1991 | Bucholtz et al. | 188/299.1 |
| 5,211,379 | 5/1993 | Porter | 267/221 |
| 5,429,217 | 7/1995 | Stringer et al. | 188/300 |
| 5,651,587 | 7/1997 | Kodaverdian | 297/423.36 |

*Primary Examiner*—Matthew C. Graham
*Assistant Examiner*—Pamela J. Lipka
*Attorney, Agent, or Firm*—Wall Marjama & Bilinski

[57] ABSTRACT

Apparatus for preventing the unwanted extension of a hydraulic lock when the lock is subjected to relatively high dynamic loads. The lock includes a hydraulic cylinder having a piston slidably mounted therein. The piston is secured to a piston rod which passes outwardly through one end wall of the cylinder. The lock is placed in tension when the piston rod is being extended and in compression when the rod is being retracted. A flow channel is formed in the piston through which fluid is exchanged from one side of the piston to the other. A manually operated spring biased control valve is mounted in the flow channel which is normally held closed by a set spring. Fluid is allowed to flow when the valve is manually opened or when the lock is placed in tension by some external force that overcomes the biasing force of the set spring. A velocity sensitive restrictor is also mounted in the flow channel that closes the channel when the lock is placed in tension by a dynamic force above a predetermined velocity.

14 Claims, 3 Drawing Sheets

STROKE LIMITING VELOCITY SENSITIVE VALVE FOR A HYDRAULIC LOCK MECHANISM

BACKGROUND OF THE INVENTION

This invention relates to a hydraulic lock with an override capability which allows for normal operation when placed in either tension or compression, but prevents the lock from being stroked in tension by dynamic forces at or above a predetermined velocity.

Although the present invention has wider applications, it will be herein described with reference to a leg rest for a seat of the type presently found on many airliners. The lock includes a hydraulic cylinder having a piston contained therein that is secured to a piston rod that passes out of the cylinder through one end wall. The rod is attached to the seat frame while the cylinder is attached to the leg rest. The lock is placed in tension as the rest moves from a generally vertical stowed position to a raised elevated position and in compression when the rest is moved back into the stowed position. A flow channel is provided in the piston that permits fluid to flow between a front and a rear chamber in the cylinder when the lock is stroked. A normally closed valve that can be activated manually by a seated passenger controls the flow of fluid through the piston. A set spring is used to bias the valve in the closed position and can be overridden without manually activating the system by simply pulling the rest upwardly at a relatively low velocity. A compression spring is employed which becomes fully compressed when the rest is stowed and which unloads to help elevate the rest when the lock is stroked in tension.

The lock override feature works well in practice to prevent damage to the system in the event a passenger who is not familiar with manual activation procedure attempts to raise the rest by physically pulling the rest out of the stowed position. The override has one drawback, however, in that it is velocity or acceleration sensitive. Accordingly, leg rest in unoccupied seats can be inadvertently raised when the lock is loaded dynamically in tension. Once raised, the leg rests will remain elevated until such time as they are manually returned to a stowed position. In the event of an emergency, where high dynamic forces are generated, many of the rests may be inadvertently raised, thereby creating a safety hazard and making it difficult for people to move about the cabin.

SUMMARY OF THE INVENTION

It is the primary objective of this invention to improve hydraulic locks.

It is a further object of this invention to improve hydraulic locks of the type generally employed in aiding in the adjustment of leg rests and, in particular, leg rests used in association with aircraft seats.

It is a still further object of the present invention to provide for the safety and comfort of aircraft passengers.

Another object of the present invention is to prevent the leg rest of an aircraft seat from being raised to an elevated position under higher than normal induced dynamic loads.

These and other objects of the present invention are attained by apparatus for preventing the unwanted extension of a hydraulic lock having a velocity sensitive override feature when the lock is subjected to a relatively high dynamic load. The apparatus includes a hydraulic cylinder containing a piston rod that passes out of the cylinder through one end wall. The rod is arranged to be stroked in tension as it moves from a retracted position toward an extended position. A piston is secured to the rod that moves in sealing contact with the inside wall surface of the cylinder. A compression spring acts to urge the piston rod from a retracted toward an extended position. The piston contains a flow channel through which fluid is exchanged from one side of the piston to the other. A manually operated valve is mounted within the flow channel that is biased by a set spring in a normally closed condition and which can be opened manually to stroke the lock in either compression or tension. The set spring biasing force can be overridden in tension by applying a relatively low velocity dynamic load to the lock. A velocity sensitive flow restrictor is also mounted in said flow channel which closes the channel in the event the valve experiences a second higher dynamic force in tension. The lock is ideally suited for use in adjusting the leg rest of an airliner seat preventing inadvertent raising of the rest due to high dynamic forces that can be exerted thereon, particularly during emergency situations.

BRIEF DESCRIPTION OF THE DRAWINGS

For a better understanding of these and other objects of the present invention, reference shall be made to the following detailed description of the invention which is to be read in association with the accompanying drawings wherein.

DESCRIPTION OF THE INVENTION

This invention involves a stroke limiting device for use in association with a hydraulic lock equipped with a static override that prevents the lock from being stroked in tension when placed under a predetermined dynamic load. Although the present device will be explained with specific reference to an airliner seat, it has wider application and can be used anywhere a hydraulic lock with a static override is employed.

Figure 1:
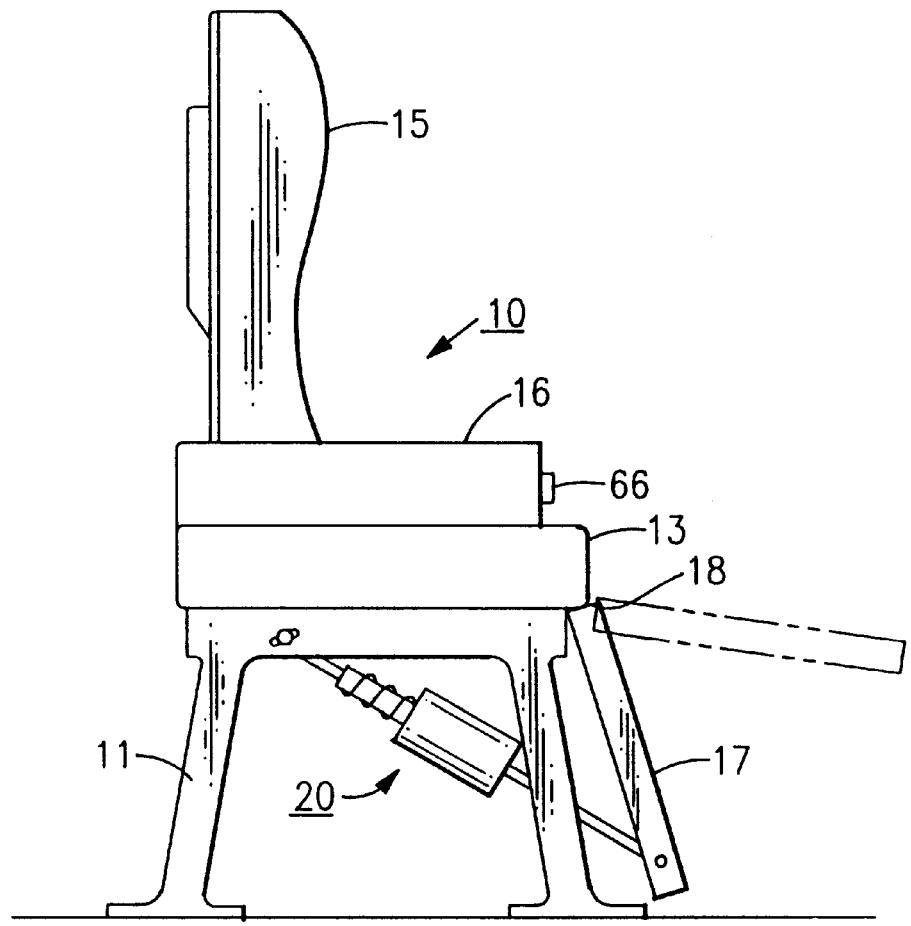
FIG. 1 is a side elevation of an airline seat having a leg rest embodying the teaching of the present invention.

Turning initially to FIG. 1, there is illustrated a seat 10 of the type found in many of today's airliners and, in particular, larger airliners used on relatively long flights where passenger fatigue can be a problem. The seat is more or less conventional and includes a rigid frame 11 that is secured to the floor of the cabin by bolts or the like so that the seat will not be dislodged when subjected to high stresses or dynamic loads. The seat includes a generally horizontal seat cushion 13 and an adjustable back rest 15 that can be tilted back from the upright position shown to provide additional comfort to a seated passenger. A pair of armrests 16 are also provided for both the comfort and safety of the passenger. The seat is further equipped with an adjustable leg rest 17 that is hinged along its top edge 18 to the frame of the seat. The leg rest is moveable between a stowed position as illustrated wherein the rest is substantially vertical and an elevated position which is shown in phantom outline.

A hydraulic lock, generally referenced 20, is further provided to hold the leg rest in a desired position as well as aiding the passenger in raising the rest to the desired position. The hydraulic lock is located beneath the seat and is mounted between the frame and the rest so that it is stroked in tension when the rest is being raised and in compression when the rest is returned from an elevated position back toward the stowed position. As will be explained in greater detail below, the hydraulic lock is equipped with an override feature that permits the lock to be overridden in tension, thus allowing the rest to be elevated without manually releasing the lock actuator.

Figure 2:
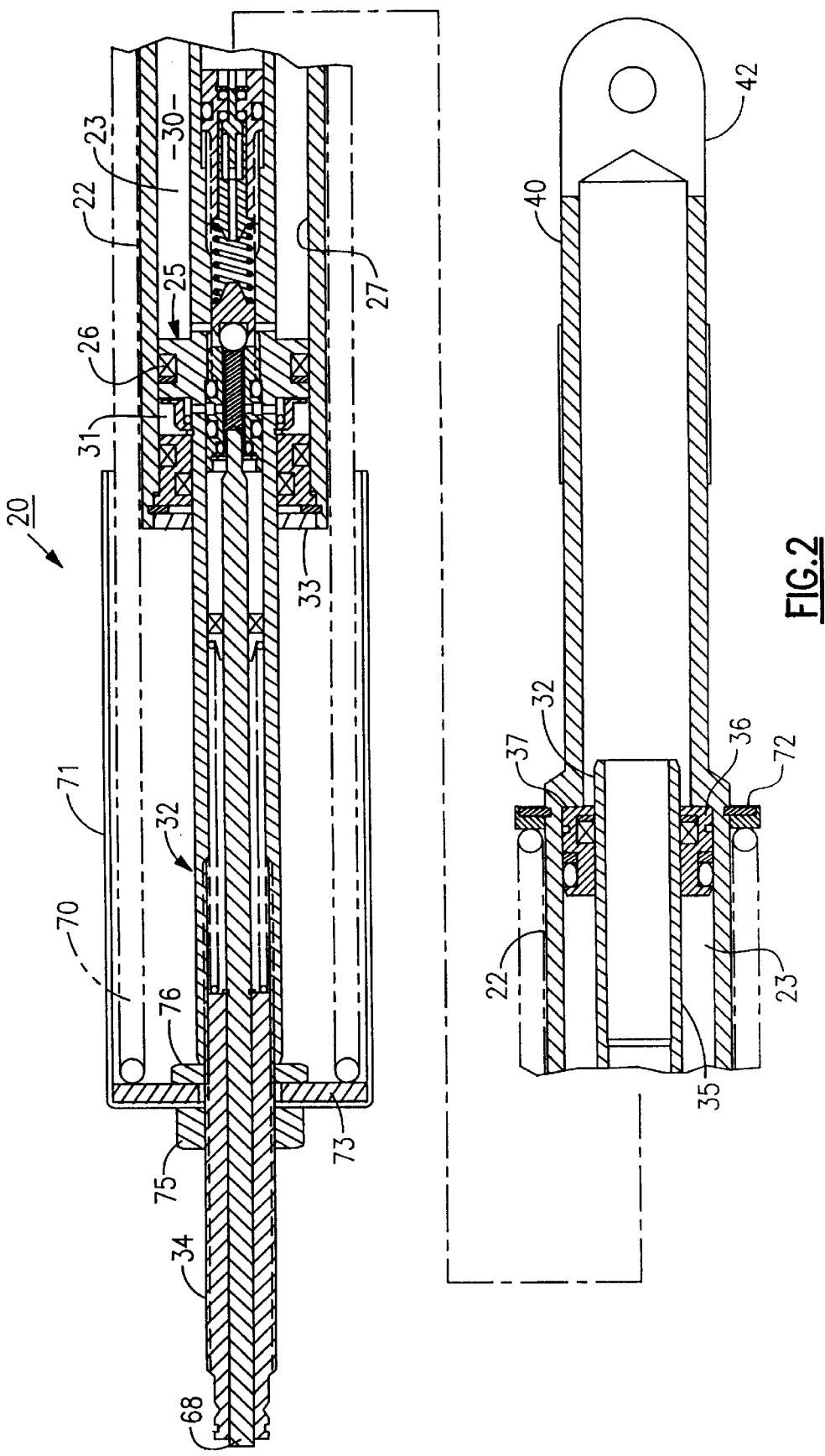
FIG. 2 is an enlarged side elevation in section showing the hydraulic lock used in association with the seat illustrated in FIG. 1 for aiding in the positioning of the leg rest.
Figure 3:
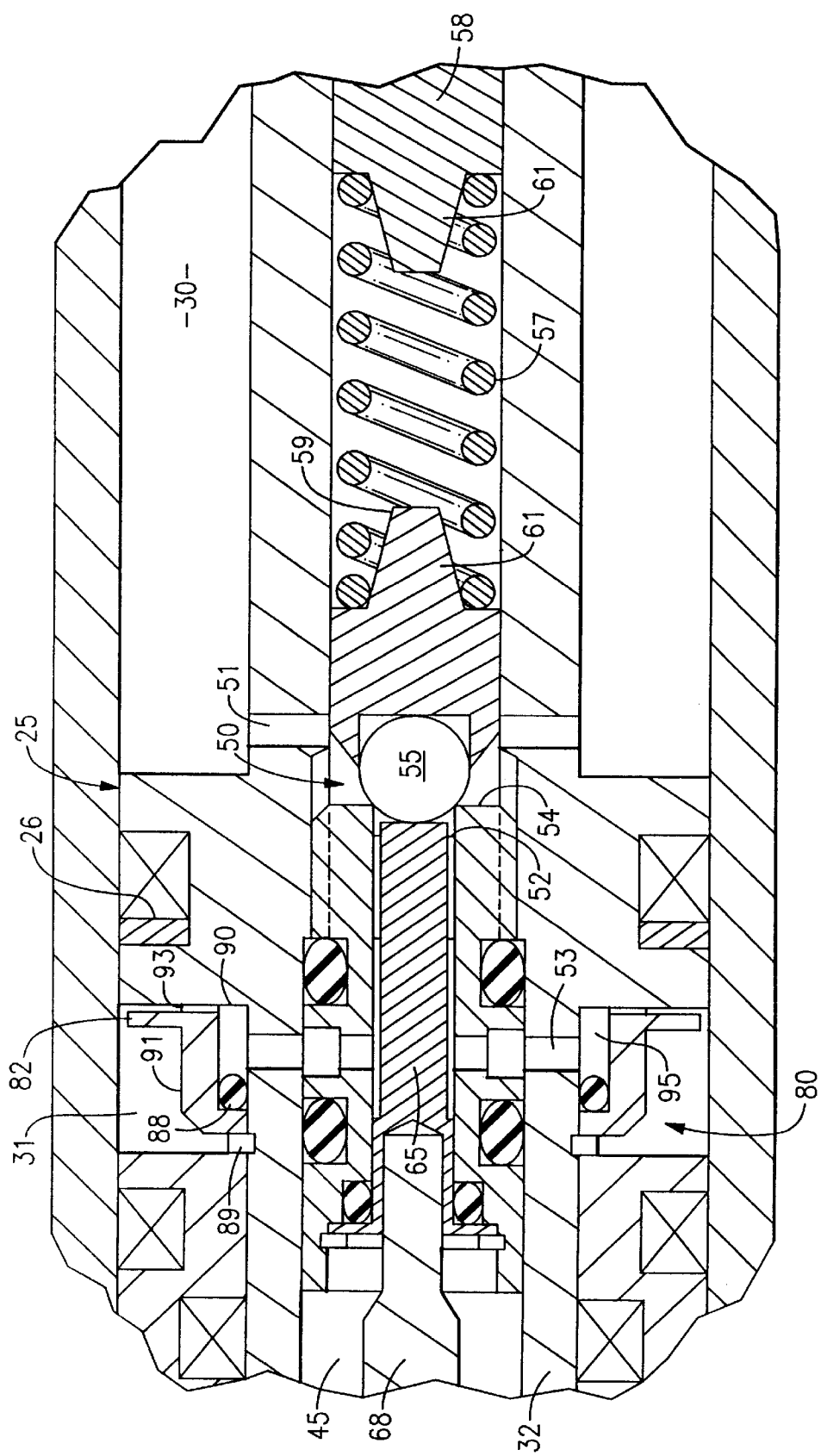
FIG. 3 is a further enlarged partial view of the present hydraulic lock further illustrating apparatus for preventing the leg rest from being elevated under high dynamic loads.

With further reference to FIGS. 2 and 3, the hydraulic lock 20 is shown in greater detail. The lock includes a hydraulic cylinder 22 containing a hydraulic fluid 23 in which a piston 25 is slidably contained. The piston is provided with a suitable seal 26 that rides in sealing contact with the inner wall surface 27 of the cylinder to prevent fluid from passing between the piston and the wall surface. The piston divides the cylinder into two chambers which are herein referred to as the front chamber 30 and the rear chamber 31. The piston is secured to a piston rod 32 that passes out of the cylinder through the front wall 33. The extended section 34 of the piston rod contains a male thread that is threaded onto a bracket (not shown) pivotably mounted in the rest. The rear end 35 of the piston rod is slidably contained in a bearing block 36 that is seated against a shoulder 37 formed in the cylinder. The cylinder further contains a hollow elongated nose section 40 that terminates in a clevis 42 that is pivotally connected to the seat frame using a suitable bracket. The bearing block contains suitable seals to prevent fluid from passing from chamber 30 into the hollow nose section.

The piston rod is illustrated in FIG. 2 in a fully extended position wherein the volume of the front chamber 31 is at a minimum value and that of the rear chamber 30 is at a maximum value.

The piston 25 is shown in greater detail in FIG. 3. The piston is integral with a hollow section 45 of the piston rod 32 and contains a flow channel generally referenced 50 that interconnects the front and rear chambers of the hydraulic cylinder 22. The flow channel included interconnected passages 51, 52 and 53. A valve seat 54 is located at the point where passage 51 enters passage 52. The seat is adapted to receive therein a ball type valve 55 that is normally held in a closed position to prevent the flow of fluid between the two fluid chambers 30 and 31. Closure of the valve is maintained by a set spring 57 that is mounted within the hollow section 45 of the piston rod. The set spring is arranged to act between a stationary end piece 58 and a moveable end piece 59 which are also contained within the hollow section of the piston rod. The ball valve 55 is mounted within a recess provided in the end face of the moveable end piece 59. The opposing end faces of the two end pieces contain tapered lugs 61—61 about which the set spring is wound. The set spring is mounted within the piston rod in a loaded condition so that it continually urges the ball into the valve seat to normally block the flow of fluid through the piston. As can be seen, the valve serves to prevent the flow of fluid between the chambers and thus, lock the piston rod in any position that it is placed.

The ball 55 can be manually unseated, thereby opening the flow channel by an actuator pin 65 mounted in the piston rod. The pin, in turn, is coupled to an actuator button 66 (FIG. 1) in the arm rest of the seat by a flexible wire 68 that passes out of the distal end of the piston rod. Depressing the button causes the pin to move to the right as viewed in FIG. 3, thereby dislodging the ball from the valve seat. This permits fluid to be exchanged between the cylinder chambers and thus, enables a person occupying the seat to easily raise or lower the leg rest when the flow channel is held in an open condition.

The spring rate of the set spring 57 is preset so that the button controlled actuator of the rest can be overridden in tension by simply pulling on the rest with sufficient force, whereby fluid in the back chamber forces the ball away from the valve seat against the biasing action of the set spring. This allows fluid to move between the chambers as long as the tensioning force remains high enough to override the set spring biasing force.

As best illustrated in FIG. 2, a compression load spring 70 is wound about the body of the hydraulic cylinder 20. The load spring is partially contained within a sleeve 71 and is loaded in compression between the end wall 72 of the sleeve and a spring retainer 73 secured to the piston rod. The top wall of the sleeve is attached to the treaded extended end of the piston rod by means of a pair of lock nuts 75 and 76. The load spring is fully compressed when the piston rod is fully retracted into the cylinder and the leg rest is in the stowed vertical position. The load spring thus serves to help raise the rest when the ball valve is opened. Returning the rest to a stored position again fully compresses the load spring.

As should be evident, under conditions of high dynamic loading, the holding action of the set spring can be overcome allowing the ball valve to open. When the valve is forced open, the load spring can combine with the dynamic forces to rapidly elevate the leg rests in unoccupied seats. Under emergency conditions, the elevated rests can pose a serious hazard in that it makes moving about in the cabin difficult and a good deal of valuable time can be consumed in restoring the rests to a stowed position.

Figure 4:
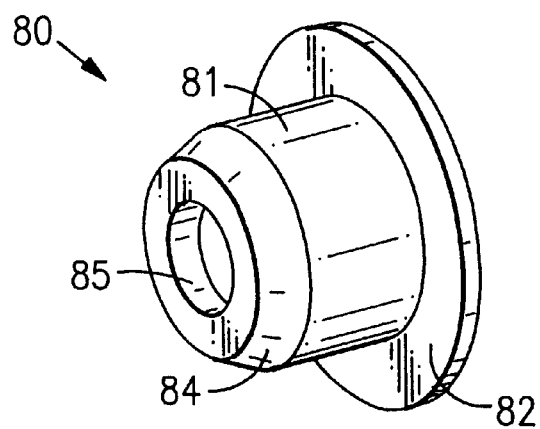
FIG. 4 is a perspective view illustrating the geometry of a flow restrictor used in the present invention.

With further reference to FIG. 4, a flow restrictor 80 is mounted behind the piston on the rear chamber side thereof. The restrictor includes a body section 81 to which a radially expanded end flange 82 is integrally connected. The opposite end of the restrictor contains necked down tapered section 84 having a hole 85 formed therein that establishes a close fit with the piston rod. An O ring 88 is mounted inside the body of the restrictor, a retaining ring 89 positions the end flange 82 adjacent to the end face 90 of the piston to form a circumferential passage 93 between the flange and the end face. As illustrated in FIG. 3, flow passage 53 of the piston flow channel is in communication with a chamber 95 provided in the body of the restrictor which, in turn, communicates with the circumferential passage 93. The end flange and the restrictor body are integrally formed of a flexible or deformable plastic material that will deform when the hydraulic lock experiences a predetermined dynamic load that places the hydraulic lock in tension which, if left unchecked, would cause the leg rest to move into an elevated position. The restrictor deforms sufficiently at or above the predetermined load to close against the rear face of the piston and thus, prevent fluid from being exchanged between the chambers and thus, preventing unwanted elevation of the leg rests under adverse conditions. The predetermined load is greater than the load exerted by the set spring so that the rest can be manually raised without using the actuator button.

While this invention has been explained with reference to the structure disclosed herein, it is not confined to the details set forth and this invention is intended to cover any modifications and changes as may come within the scope of the following claims:

What is claimed:

1. A hydraulic lock that includes a hydraulic cylinder slidably containing a piston secured to a piston rod that passes out of the cylinder through one end wall thereof, said piston containing a flow channel through which fluid is exchanged between a front chamber and a rear chamber, a manually activated normally closed valve mounted in said flow channel for selectively opening and closing the flow channel, override means for automatically opening said valve in the event the piston rod is stroked in tension under a first dynamic load, a load sensitive flow restrictor mounted in said flow channel said restrictor being formed of a flexible material that deforms when the piston rod is stroked in tension under a second dynamic load that is higher than said first dynamic load to close said flow channel.

2. The apparatus of claim 1 wherein said lock is stroked in tension as the piston rod is extended away from said one end wall and in compression as the piston rod is retracted toward said one end wall.

3. The apparatus of claim 2 wherein said flow restrictor includes a section that encircles the piston rod and a radially extended end flange that is positioned adjacent to one side wall of said piston to establish a flow passage therebetween that forms part of said flow channel whereby said flange closes against said one side wall when the lock is stroked in tension under said second higher dynamic load.

4. The apparatus of claim 3 wherein said restrictor further includes a sealing means to prevent fluid from passing between the body of the restrictor and said piston rod.

5. The apparatus of claim 1 wherein said normally closed valve includes a valve seat in said flow channel and a ball that is biased at said seat by a set spring having a spring rate such that the ball is released from said seat when the rod is placed in tension under said first dynamic load.

6. The apparatus of claim 1 that further includes a compression spring acting between the piston rod and the hydraulic cylinder to urge the rod into a fully extended position.

7. A hydraulic lock for adjusting the position of a leg rest hinged to the frame of a seat between a vertical stowed position and a raised elevated position, said lock including a hydraulic cylinder containing a piston secured to a piston rod that passes out of said cylinder through one end wall thereof, said cylinder being pivotally secured between said frame and said leg rest so that the rest is in the stowed position when the piston rod is fully retracted and is in an elevated position when the rod is extended to a second position away from said one end wall, a flow channel through which fluid is exchanged from one side of the piston to the other side when the piston rod is loaded in either tension, wherein the rod is forced toward the extended position, or compression wherein the rod is forced toward the retracted position, a manually actuated normally closed valve mounted in said flow channel for controlling the flow of fluid through said flow channel, a manually operated actuator means that is operable to open said valve, and a load sensitive flow restrictor, said restrictor being formed of a deformable material that deforms to close the flow channel when the piston rod is stroked in tension under a first dynamic load.

8. The hydraulic lock of claim 7 that further includes a load spring acting between the piston rod and the hydraulic cylinder that is arranged to place the piston rod under tension.

9. The hydraulic lock of claim 7 wherein said normally closed valve includes a valve seat located in said flow channel, a ball that is biased into closure against the valve seat by a set spring, said set spring having a spring rate such that the ball is released from the valve seat when the piston rod is stroked in tension under a second dynamic load that is less than said first dynamic load.

10. The hydraulic lock of claim 9 that further includes an actuator associated with said valve seat that is manually operable for dislodging the ball from said seat.

11. The hydraulic lock of claim 10 wherein said flow restrictor includes a body section that encircles the piston rod and a radially extended end flange that is positioned adjacent to one side wall of the piston to establish a flow passage therebetween that forms part of said flow channel.

12. The hydraulic lock of claim 11 wherein said flow restrictor is formed of a material that deforms under said first dynamic load sufficiently to close against an adjacent side wall of said channel to prevent fluid from moving between a front chamber on one side of the piston and a rear chamber on the other side of the piston.

13. A hydraulic lock for adjusting the position of a leg rest hinged to the frame of a seat between a vertical stowed position and a raised elevated position, said lock including a hydraulic cylinder containing a piston secured to a piston rod that passes out of said cylinder through one end wall thereof, said cylinder being pivotally secured between said frame and said leg rest so that the rest is in the stowed position when the piston rod is fully retracted and is in an elevated position when the rod is extended to a second position away from said one end wall, a flow channel through which fluid is exchanged from one side of the piston to the other side when the piston rod is loaded in either tension, wherein the rod is forced toward the extended position, or compression wherein the rod is forced toward the retracted position, a manually actuated normally closed valve mounted in said flow channel for controlling the flow of fluid through said flow channel, said normally closed valve includes a valve seat located in said flow channel, a ball that is biased into closure against the valve seat by a set spring, said set spring having a spring rate such that the ball is released from the valve seat when the piston rod is stroked in tension under a second dynamic load that is less than said first dynamic load, an actuator associated with said valve seat that is manually operable for dislodging the ball from said seat, a manually operated actuator means that is operable to open said valve, and a load sensitive flow restrictor mounted in said flow channel for automatically closing the flow channel in the event the piston rod is stroked in tension under a first predetermined dynamic load, said flow restrictor having a body section that encircles the piston rod and a radially extended end flange that is positioned adjacent to one side wall of the piston to establish a flow passage wherein said flow restrictor is formed of a material that deforms under said first dynamic load sufficiently to close against an adjacent side wall of said channel to prevent fluid from moving between a front chamber on one side of the piston and a rear chamber on the other side of the piston therebetween that forms part of said flow channel.

14. The hydraulic lock of claim 13 wherein said flow restrictor further includes a sealing means for forming a seal between the body of the flow restrictor and the piston rod.

\* \* \* \* \*